United States Patent [19]

Seiffert et al.

[11] 3,997,190
[45] Dec. 14, 1976

[54] SAFETY ARRANGEMENT

[75] Inventors: Ulrich Seiffert, Braunschweig;
Burckhard Strüwe, Fallersleben;
Hannu Paitula, Wolfsburg; Gunnar Borenius, Schanbach, all of Germany

[73] Assignee: Volkswagenwerk Aktiengesellschaft, Wolfsburg, Germany

[22] Filed: Oct. 11, 1973

[21] Appl. No.: 405,502

[30] Foreign Application Priority Data
Oct. 11, 1972 Germany .................. 2249732

[52] U.S. Cl. .................. 280/747; 188/1 C; 297/389
[51] Int. Cl.[2] ..................... B60R 21/02
[58] Field of Search ............ 280/150 SB, 744, 746, 280/747; 297/385, 389; 188/1 C; 2/3

[56] References Cited
UNITED STATES PATENTS

| | | | |
|---|---|---|---|
| 3,098,629 | 7/1963 | Fondén et al. | 188/1 C X |
| 3,302,973 | 2/1967 | Ravau | 280/150 SB X |
| 3,318,634 | 5/1967 | Nicholas | 297/385 X |
| 3,550,957 | 12/1970 | Radke et al. | 188/1 C UX |
| 3,618,975 | 11/1971 | Bombach | 280/150 SB |
| 3,765,700 | 10/1973 | Littmann | 280/150 SB |
| 3,804,698 | 4/1974 | Kinloch | 2/3 X |

FOREIGN PATENTS OR APPLICATIONS

| | | | |
|---|---|---|---|
| 1,081,612 | 8/1967 | United Kingdom | 188/1 C |

*Primary Examiner*—Robert R. Song
*Assistant Examiner*—Michael J. Forman
*Attorney, Agent, or Firm*—Brumbaugh, Graves, Donohue & Raymond

[57] ABSTRACT

A safety arrangement for motor vehicles includes a safety belt for retaining a vehicle occupant on a seat. A predetermined length of belt is released if the vehicle receives an impact resulting in a tension in the safety belt that exceeds a predetermined value.

11 Claims, 5 Drawing Figures

SAFETY ARRANGEMENT

BACKGROUND OF THE INVENTION

1. Field of the Invention

The present invention relates generally to automotive safety arrangements, and, more particularly, to passenger safety arrangements including a safety belt for retaining a vehicle occupant on his seat.

2. Description of the Prior Art

Conventional automotive passager safety belts connect or link a vehicle occupant to the vehicle as rigidly and firmly as possible when an accident occurs, so that the high rates of vehicle acceleration or deceleration, which occur in connection with the accident, are transmitted as directly as possible to the occupant. Without such a firm and rigid vehicle occupant control, high relative accelerations between the vehicle and the occupant during an accident would cause severe and often fatal injuries to the occupant as a result of the forceful impacts of portions of the occupant's body with parts of the vehicle interior.

It has also been found that, in many cases, conventional safety belts could not prevent serious injuries, particularly to the head of the occupant. Extensive tests conducted with dummies having fastened seat belts have evaluated the motions that occur in accidents involving frontal impacts, and it has been found that the relatively freely movable head of a vehicle occupant who is fastened to his seat by a seat belt of the vehicle moves in a rotary motion around the upper portion of the human body, which is retained or kept back by the seat belt when the vehicle is subjected to a rapid deceleration. That motion, which expresses itself as a nodding movement and may be illustrated as a rotation around an axis along the retaining safety belt, starts approximately when the ability of the loaded safety belt to expand or flex is exhausted and the body of the occupant is inflexibly retained by the belt. The nodding motion is often increased by the inherent elasticity of the safety belt, which pulls or yanks the body of the occupant back toward his seat and in a direction opposite that of the acceleration of the head. In any event, the nodding motion of the head increases the speed with which the head of an occupant in the car may strike parts of the vehicle interior, for example, the steering wheel.

It is known to include in the safety belt an impact-dampening, flexible intermediate link to prevent the occupant's body from being pulled back. Thereby, the backward pull caused by the elasticity of the safety belt may be, to some extent, eliminated, however, the head of the car's occupant still experiences a severe nodding motion.

SUMMARY OF THE INVENTION

There is provided, in accordance with the invention, an arrangement of safety belts such that the impact of portions of the body of a vehicle occupant, particularly the head, with parts of the interior of the vehicle occurs under more favorable conditions and at lower speeds than with previously known arrangements. It is primarily intended to reduce, by means of the invention, the effect of the nodding motion of the head during an impact to the greatest possible extent.

According to the invention, a safety belt is provided with the capability of promptly releasing a length of the belt when a predetermined force of retention, for example, when the expandability of the belt is exhausted, is exceeded. Thereby the dangerous nodding motion of the head is largely prevented since the release of a belt length permits a forward shifting of the occupant's body and thereby of the axis of the rotary motion of the head. Any impact of the occupant's upper body portion onto parts of the car interior, which should be provided with energy-absorbing impact elements, will then take place only at speeds that will largely exclude the possibility of serious injury. The entire free space in front of the occupant in the vehicle, however, is exploited or utilized in an advantageous manner for retention.

According to one embodiment of the invention, the safety belt may include at least one intermediate member of two parallel belt portions of different length that are placed one on top of the other, the shorter belt portion being fabricated of a material that will tear when the predetermined force of retention is exceeded. The prompt release of a length of the belt is achieved, therefore, since the shorter belt portion tears and the longer belt portion, which is parallel to the short belt, subsequently comes into supporting action.

In order to provide the safety belt with an automatic belt winding capability, it will be advantageous to use the intermediate member to secure the safety belt lock on the frame of the vehicle. Thereby, the safety belt may be rewound without difficulty when not in use. If the intermediate member or link were arranged at another position on the belt, the belt rewinding and handling would be difficult since it would be thicker at the intermediate member position.

According to a further embodiment of the invention, the vehicle is provided with energy-absorbing impact elements, which, together with the longer belt portion of the belt, catch and hold the occupant upon separation of the shorter belt portion. It is particularly advantageous to provide the steering wheel with an energy-absorbing design. By using properly shaped vehicle interior furnishings, in addition to the safety belt, for absorbing the forces resulting from frontal collisions, a highly advantageous diversion of the forces is achieved that exploits the entire interior space present in front of the occupant in the vehicle.

BRIEF DESCRIPTION OF THE DRAWINGS

A better understanding of the invention can be gained from a consideration of the following description of preferred embodiments, in conjunction with the appended figures of the drawings, wherein.

DESCRIPTION OF THE PREFERRED EMBODIMENTS

Figure 1:
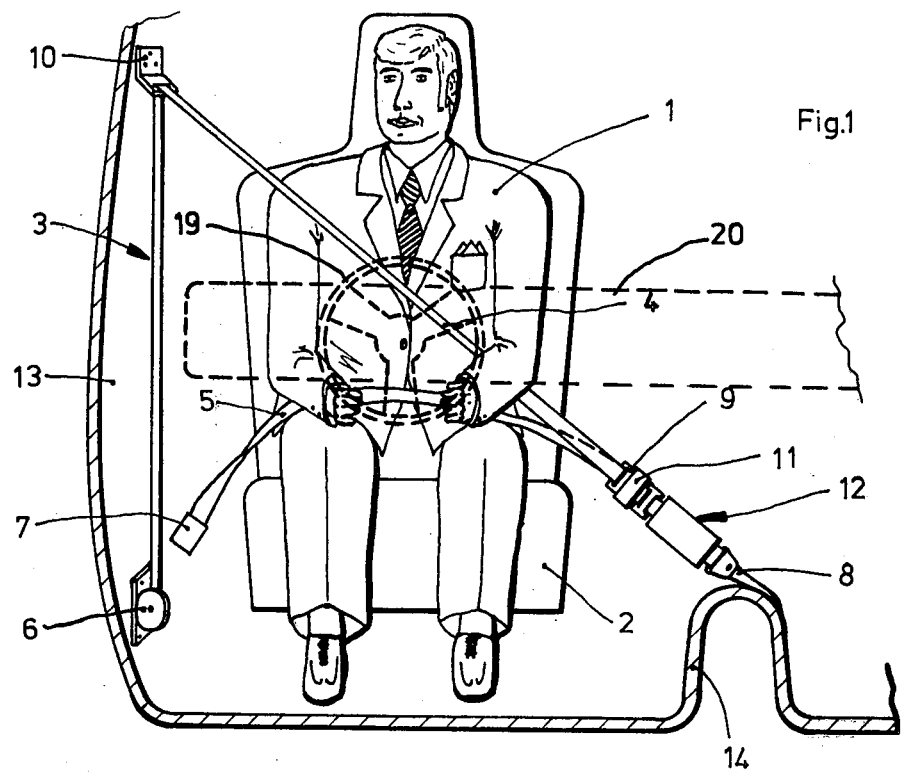
FIG. 1 is a view of a vehicle passenger protected by the safety arrangement in accordance with the invention.

Referring to FIG. 1, a motor vehicle occupant 1, is shown fastened to a seat 2 by a three-point safety belt 3. The belt extends from a belt fixture 7, secured to a vehicle body part 13, on a horizontal plane across seat 2 as a pelvis belt 5, to the run-through fixture 9 of a lock part 11, which is positioned on the side of the seat opposite fixture 7. From there, the belt 3 extends generally diagonally across the chest of the occupant as an inclined shoulder belt to the upper or top run-through fixture 10, which is secured to the vehicle body side part 13, and terminates at the belt-winding device 6 in a vertical orientation. The end of belt lock 11 opposite the run-through fixture 7 is secured on a drive-shaft tunnel 14 by means of a securing fixture 8. Between the belt lock 11 and the securing fixture 8 is an intermediate link 12.

Figure 2:
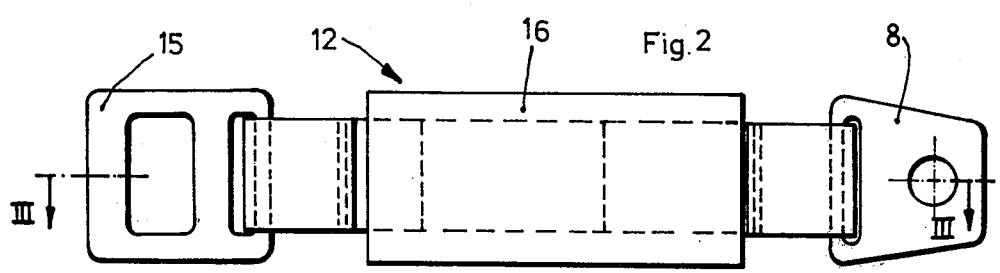
FIG. 2 is a plan view of an intermediate member of the safety arrangement of FIG. 1.
Figures 3, 4, 5:
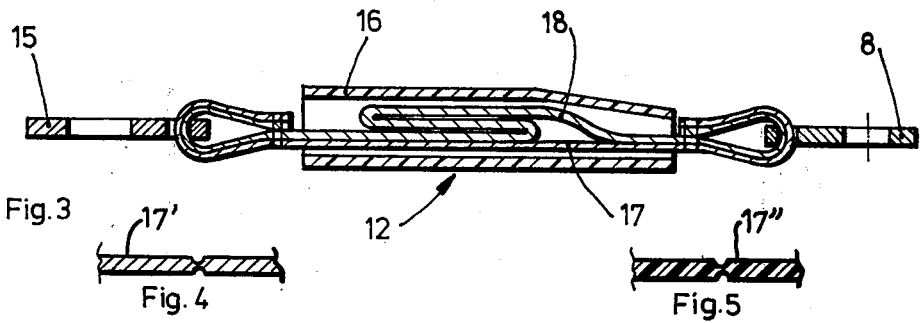
FIG. 3 is a longitudinal, cross-sectional view of the intermediate member shown in FIG. 2.
FIG. 4 is a cross-sectional view of a portion of an intermediate member according to a further embodiment of the invention.
FIG. 5 is a cross-sectional view similar to FIG. 4 of a further embodiment of the invention.

Details of the intermediate link 12 may be seen with greater clarity by reference to FIGS. 2 and 3. The intermediate link 12 is connected between the securing fixture 8 and an insert tongue 15, which is inserted into belt lock 11, and is formed essentially of two parallel belt portions 17 and 18 of different lengths that are placed one on top of the other. The ends of the belt portions 17 and 18 are, in each case, looped through respective eyes provided on securing tongue 8 and insert tongue 15 and then secured in a conventional manner, for example, by stitching. A sleeve 16, which may consist, for example, of a plastic material, is pushed over the two belt portions 17 and 18 to prevent the longer belt portion 18 from hanging loosely and, perhaps, catching onto parts of the interior of the vehicle.

In operation, the belt 3 is stressed and expanded by the forward shifting of the occupant in the event of a frontal collision to the vehicle. After the limit of expansion of belt 3 has been reached, occupant 1 would, in a conventional arrangement, be rigidly retained by the belt, and the occupant would experience the previously described nodding motion of his head.

In accordance with the invention, however, the nodding motion of the occupant's head is prevented since the shorter belt portion 17 of intermediate link 12 will tear at the moment that the belt 3 becomes rigid, thereby releasing a belt length corresponding to the difference in length between belt portions 17 and 18. The rigid or inflexible retention of the upper torso of the occupant is, therefore, cancelled by the prompt release of the belt length; an additional forward shifting of the occupant's body takes place, and the dangerous rotary motion of the head of the occupant is largely avoided. The force of retention of the occupant at which the shorter belt portion 17 tears, will depend on the type of safety belt used and on the behavior of the vehicle when subjected to deformation. In addition, the tearing of belt portion 17 should take place approximately at the moment at which the rotary motion of the head begins.

Upon tearing of belt portion 17 and the continued forward shifting of the body of vehicle occupant 1, the longer belt portion 18 of intermediate link 12 comes into supporting action. During severe impacts to the vehicle, the occupant would experience motions at the extension of the longer belt portion 18 that are similar to those previously described. If, however, a portion of the force of retention is supplied by energy-absorbing impact elements provided in the interior space of the vehicle, for example, by an energy-absorbing steering wheel 19 and dashboard 20, as shown in FIG. 1, the impact or striking of the upper torso, particularly the head, of the vehicle occupant will take place at a speed that, in cooperation with the energy-absorbing, flexible design of the impact elements, nearly precludes the possibility of injuries of a more serious nature.

The use of the intermediate link 12 to secure the insert latch or tongue 15 of belt lock 11 offers the advantage, particularly in connection with safety belts having a rewinding device, that the belt may be rewound in the usual manner. If, on the other hand, the intermediate link 12 were positioned at another point along the length of belt 3, the thickness of the intermediate link could cause interferences with the self-winding of the belt in that it would not pass smoothly through run-through fixtures 9 or 10 or through the winding device 6.

In a three-point safety belt, the arrangment of the intermediate belt on the common point at which the inclined shoulder belt 4 and the pelvis belt 5 are secured offers the advantage that, upon tearing of the shorter belt portion 17 of intermediate link 12, both belts are simultaneously extended, so that the upper and lower body parts of the occupant are uniformly shifted in a forward direction. The simultaneous forward shifting of the entire body of the occupant helps prevent a rotary motion and, possibly, the previously described serious and damaging consequences to the occupant.

In particular, a safety arrangement according to the invention produces a highly useful and advantageous restraining system for smaller vehicles, which generally lack sufficient interior space for an entirely injury-free restraint of the human body in accidents involving frontal collisions. While exploiting the available vehicle interior space, the arrangement largely excludes the occurrence of seriour injuries.

Although the invention has been described with reference to specific embodiments thereof, many modifications and variations of such embodiments may be made by those skilled in the art without departing from the inventive concepts disclosed. For example, the tearing belt portion 17 may be formed of metal or plastic material, as shown in FIGS. 4 and 5, respectively, that is selected and shaped to separate when the tension in the belt 3 exceeds the predetermined force of retention. The belt portions 17' and 17" may be shaped as wires or flat bands, and may be scored or otherwise marked to ensure separation at a specific point or points. It would also be possible to modify the belt configuration without sacrificing the advantages of the invention by securing the tongue 15 to the belt 3, in which case the belt lock 11 would be attached to the intermediate link 12.

Accordingly, all such modifications and variations are intended to be included within the spirit and scope of the appended claims.

We claim:

1. A safety belt arrangement for a vehicle, such as a motor vehicle, comprising at least a shoulder safety belt for retaining a vehicle occupant with respect to a seat and abrupt releasing means associated with the safety belt for instantaneously releasing a single predetermined length of belt upon transmission to the releasing means of any tensile force exceeding a predetermined force, when the safety belt is securely engaging the occupant of the seat, to elongate the safety belt without automatically retracting the predetermined length of belt thereafter, said predetermined length of belt being so arranged and of such measure, with respect to the occupant space of the vehicle, as to permit the entire body of the occupant to float forward out of the seat without substantial restraint from the belt for an available distance within said space and to then be restrained by the safety belt at its elongated length, thereby preventing a nodding motion of the occupant's head upon sudden deceleration.

2. A safety belt arrangement for a vehicle, such as a motor vehicle, comprising at least a shoulder safety belt for retaining a vehicle occupant on a seat and means associated with the safety belt for releasing only a single predetermined length of belt upon transmission to the releasing means of any tensile force exceeding a predetermined force when the safety belt is securely engaging an occupant of the seat, without automatically retracting the predetermined length of belt thereafter, said predetermined length of belt being of such measure, with respect to the occupant space of the vehicle, as to permit the occupant to move forward without restraint for an available distance within said space, thereby preventing a nodding motion of the occupant's head upon sudden deceleration, wherein said releasing means includes a long belt portion and a short belt portion in parallel configuration, the short belt portion being coupled to the long belt portion at points adjacent opposite ends of at least one of the long and short belt portions so that the short belt portion is extended under tension when the safety belt is securely engaging an occupant of the seat and so that the difference in length of said long and short belt portions between the points at which the short belt portion is coupled to the long belt portion is equal to said predetermined belt length, said short belt portion being fabricated to separate into two parts when the tension therein exceeds said predetermined force.

3. The arrangement according to claim 2, wherein said releasing means includes a sleeve for receiving said long and short belt portions in a generally parallel storage configuration.

4. The arrangement according to claim 2, wherein said short belt portion comprises a one-piece separation element formed of a metal or plastic material and adapted to separate into two parts.

5. The arrangement according to claim 4, wherein said separation element is shaped as a flat band and has an intended separation point.

6. A safety belt arrangement for a vehicle, such as a motor vehicle, comprising at least a shoulder safety belt for retaining a vehicle occupant on a seat and means associated with the safety belt for releasing only a single predetermined length of belt upon transmission to the releasing means of any tensile force exceeding a predetermined force when the safety belt is securely engaging an occupant of the seat, without automatically retracting the predetermined length of belt thereafter, said predetermined length of belt being of such measure, with respect to the occupant space of the vehicle, as to permit the occupant to move forward without restraint for an available distance within said space, thereby preventing a nodding motion of the occupant's head upon sudden deceleration, wherein said safety belt includes self-acting, rewinding means at one side of said seat and said releasing means includes means for coupling said safety belt to the vehicle at the opposite side of said seat.

7. A safety belt arrangement for a vehicle, such as an automobile, comprising at least a shoulder safety belt for retaining a vehicle occupant with respect to a vehicle seat, said safety belt in a normal operative mode having a first length at which it is applied securely about the body of the occupant seated in the seat, elongation means associated with the safety belt for achieving a predetermined second length in the safety belt longer than the first length, said safety belt when elongated to the second length during an emergency mode, such as on frontal impact of the vehicle with an obstacle, being so arranged and of such measure with respect to vehicle compartment space forward of the occupant in his seat as to permit the entire body of the occupant to float forward out of the seat without substantial restraint from the belt for an available distance within the compartment space, and abrupt releasing means associated with the safety belt and the elongation means for instantaneously releasing the belt from its first length to its second elongated length during the emergency mode upon transmission to the releasing means of any tensile force exceeding a predetermined force, said releasing means and said elongation means cooperating to permit the occupant upon release in the emergency mode to bodily float forward the available distance in the compartment space and be restrained by the safety belt at its second elongated length, whereby the nodding motion of the occupant's neck and head, normally incurred when the body of the occupant is restrained to his seat during sudden deceleration of the vehicle, is thereby substantially prevented.

8. In a vehicle, such as a motor vehicle, having at least a safety shoulder belt for retaining a vehicle occupant on a seat and energy-absorbing impact means, such as an impact absorbing steering wheel, on portions of the vehicle interior, the improvement comprising means, in cooperation with the safety belt, for releasing only a single predetermined length of belt immediately upon transmission to the releasing means of any tensile force exceeding a predetermined force, when the safety belt is securely engaging an occupant of the seat, without automatically retracting the predetermined length of belt thereafter, said predetemined length of belt being of such measure, with respect to the occupant space of the vehicle, as to permit the occupant to move forward without restraint for an available distance within said space, thereby preventing a nodding motion of the occupant's head upon sudden deceleration, wherein said releasng means includes a long belt portion and a short belt portion in parallel configuration, the short belt portion being coupled to the long belt portion at points adjacent opposite ends of at least one of the long and short belt portions so that the short belt portion is extended under tension when the safety belt is securely engaging an occupant of the seat and so that the difference in length of said long and short belt portions between the points at which the short belt portion is coupled to the long belt portion is equal to said predetermined belt length, said short belt portion being fabricated to separate into two parts when the tension therein exceeds said predetermined force.

9. The vehicle defined in claim 8, wherein said short belt portion comprises a one-piece separation element formed of a metal or plastic material and adapted to separate into two parts.

10. In a vehicle, such as an automobile, having at least a shoulder safety belt for retaining a vehicle occupant with respect to a vehicle seat, said safety belt in a normal operative mode having a first length at which it is applied securely about the body of the occupant seated in the seat, and energy-absorbing impact means, such as an impact-absorbing steering wheel, on portions of the vehicle interior forward of the occupant in his seat, the improvement comprising:

elongation means associated with the safety belt for achieving a predetermined second length in the safety belt longer than the first length, said safety belt when elongated to the second length during an emergency mode, such as on frontal impact of the vehicle with an obstacle, being so arranged and of such measure with respect to vehicle compartment space forward of the occupant in his seat as to permit the entire body of the occupant to float forward out of the seat without substantial restraint from the belt for an available distance within the compartment space, and abrupt releasing means associated with the safety belt and the elongation means for instantaneously releasing the belt from its first length to its second elongated length during the emergency mode upon transmission to the releasing means of any tensile force exceeding a predetermined force, said releasing means and said elongation means cooperating to permit the occupant upon release in the emergency mode to bodily float forward the available distance in the compartment space and be restrained by the safety belt at its second elongated length in conjunction with impact upon the energy-absorbing impact means, whereby the nodding motion of the occupant'neck and head, normally incurred when the body of the occupant is restrained to his seat during sudden deceleration of the vehicle, is thereby substantially prevented.

11. The vehicle defined in claim 10, wherein said safety belt includes self-acting, rewinding means at one side of said seat and said releasing means includes means for coupling said safety belt to the vehicle at the opposite side of said seat.

* * * * *